(12) United States Patent
Chen et al.

(10) Patent No.: US 7,657,858 B2
(45) Date of Patent: Feb. 2, 2010

(54) AUTOMATED ELECTROSTATIC DISCHARGE STRUCTURE PLACEMENT AND ROUTING IN AN INTEGRATED CIRCUIT

(75) Inventors: Youang Pin Chen, Allentown, PA (US); Sireesha Tulluri Lakshmi Naga Venkata Srujana, Bangalore (IN); Nirav Patel, Bangalore (IN); Raghunatha Reddy Lakki Reddy, Bangalore (IN); Sivaramakrishnan Subramanian, Bangalore (IN); Venkat Rao Vallapaneni, Bangalore (IN)

(73) Assignee: Agere Systems Inc., Allentown, PA (US)

( * ) Notice: Subject to any disclaimer, the term of this patent is extended or adjusted under 35 U.S.C. 154(b) by 107 days.

(21) Appl. No.: 11/565,023

(22) Filed: Nov. 30, 2006

(65) Prior Publication Data

US 2008/0134119 A1     Jun. 5, 2008

(51) Int. Cl.
*G06F 17/50* (2006.01)
(52) U.S. Cl. ......................................................... 716/9
(58) Field of Classification Search ................ 716/1–18
See application file for complete search history.

(56) References Cited

U.S. PATENT DOCUMENTS

| | | | | |
|---|---|---|---|---|
| 5,491,640 A * | 2/1996 | Sharma et al. | ................. | 716/18 |
| 5,784,289 A * | 7/1998 | Wang | ............................. | 716/8 |
| 5,963,729 A * | 10/1999 | Aji et al. | ......................... | 716/5 |
| 7,065,728 B2 | 6/2006 | Bakir et al. | | |
| 7,089,526 B1 * | 8/2006 | Salowe et al. | ................. | 716/14 |
| 2003/0009736 A1 * | 1/2003 | Suto | .............................. | 716/8 |
| 2004/0139413 A1 * | 7/2004 | DeHon et al. | .................. | 716/9 |
| 2007/0035900 A1 * | 2/2007 | Huber et al. | .................. | 361/56 |

OTHER PUBLICATIONS

J.K. Ousterhout, "Corner Stitching: A Data-Structuring Technique for VLSI Layout Tools," IEEE Trans. Computer-Aided Design, vol. CAD-3, No. 1, Jan. 1984, pp. 87-100.

* cited by examiner

*Primary Examiner*—Jack Chiang
*Assistant Examiner*—Aric Lin
(74) *Attorney, Agent, or Firm*—Ryan, Mason & Lewis, LLP

(57) ABSTRACT

A processor-implemented means of designing a power pad layout includes determining a location of at least one ESD structure so as to minimize a placement cost and determining a location of at least one connection between the at least one ESD structure and at least one power ring. The step of determining a location of at least one connection between the ESD structure and at least one power ring may include the steps of determining a minimum spanning tree of elements associated with a given power ring; and back-tracing through a minimum spanning tree of elements associated with a given power ring in order to determine a minimal list of routed paths among the elements.

20 Claims, 5 Drawing Sheets

AUTOMATED ELECTROSTATIC DISCHARGE STRUCTURE PLACEMENT AND ROUTING IN AN INTEGRATED CIRCUIT

FIELD OF INVENTION

The present invention relates generally to integrated circuit (IC) design, and more particularly relates to improved layout techniques in an IC.

BACKGROUND OF INVENTION

Despite shrinking IC feature sizes and a reduction in power supply voltages, power consumption of circuits, especially those circuits fabricated using deep submicron technologies, often causes large switching currents to flow in a power distribution network in an IC which can degrade performance and reliability of the IC. A robust power distribution network, which may include power pads, power rings, coupling caps, bond pads, and wire bonds, is therefore essential to ensure reliable operation of circuits in the IC, ideally without sacrificing performance of the IC. This poses a serious problem for the design of the power distribution network.

On-chip power demand is met through external power sources (e.g., power and ground). These external power sources are typically connected to internal power rings, also referred to as buses, which run along a periphery of the IC to deliver the desired power at a specified voltage. Power pad structures, also located around the periphery of the IC, serve to connect the external power supplies to the on-chip power rings as well as to connect the external power supplies to functional circuitry within a core of the IC. Since power pads, as well as input/output (IO) signal pads, serve as interface points between the external world and vulnerable on-chip circuitry, power pads typically employ electrocstatic discharge (ESD) structures. These ESD structures protect the on-chip circuitry from the damaging external voltage surges often attributable to an ESD event. The power pad structure often further includes at least a portion of the power rings, pad pin, core pin, and connections in a given frame. The on-chip functionality will determine the number of power supplies required by the IC. For each power bus of a given type required, there will be a unique set of power rings, as well as a unique set of power pad structures, associated therewith.

One problem in designing a power distribution network in an IC is that there are many unknowns until the end stages of the design cycle. For example, the overall resistance of a given connection will depend upon the layout of that connection in the IC (e.g., the length and width of the connection, how many bends in the connection, whether or not vias are used to connect between two different metal layers, etc.). Nevertheless, it is often necessary to make decisions regarding the structure, size and layout of the power distribution network relatively early in the design cycle, when a large part of the chip design has not even begun. Unfortunately, most commercial verification tools focus on post-layout verification of the power distribution network, after the entire chip design is substantially complete and detailed information about parasitics associated with the power and ground lines and the respective currents drawn by the transistors are known. Power distribution network problems revealed at this stage are usually very difficult and/or costly to fix, so the preferred methodologies help to design an initial power grid and refine it progressively at various stages of the design. Unfortunately, current methodologies tend to be manual and thus time-consuming and error-prone.

While it is known to use automated place and route programs for laying out certain functional circuit blocks and components in the IC, laying out of power pad structures, including placement of ESD and routing of various components of power pads, are typically performed manually due, at least in part, to certain unique characteristics of the structures themselves. Moreover, in performing automated design rule checking (DRC) to verify that an IC layout satisfies prescribed constraints of a given fabrication process, ESD structures are typically removed from consideration since they often generate erroneous DRC errors. These DRC errors must be resolved manually in the ESD structures. Consequently, the placement and routing process, when ESD structures are involved, becomes significantly more tedious, time consuming and prone to errors and is therefore undesirable.

Accordingly, there exists a need for techniques for more optimally placing and routing ESD structures in an IC, as well as establishing the best possible connections among power rings, ESD structures, pad pins, and core pins, which do not suffer from one or more of the above-noted problems associated with conventional design methodologies.

SUMMARY OF THE INVENTION

In the accordance with the aforementioned need, the present invention, in illustrative embodiments thereof comprises more efficient techniques for automatically laying out power pads, or other external interface pads, in an IC.

In accordance with one aspect of the present invention, a computer-implemented method of producing a power pad layout includes determining a location of at least one electrostatic discharge protective device (ESD) so as to minimize a placement cost and determining a location of at least one connection between the at least one ESD and at least one power ring. The step of determining a location of at least one connection between the at least one ESD and at least one power ring may include the steps of determining a minimum spanning tree of elements associated with a given power ring; and back-tracing through a minimum spanning tree of elements associated with a given power ring in order to determine a minimal list of routed paths among the elements. Other aspects of the present invention include an processor-based apparatus for performing the above steps and a machine-readable storage medium containing programs that, when executed, will perform the above steps.

These and other features and advantages of the present invention will become apparent from the following detailed description of illustrative embodiments thereof, which is to read in connection with the accompanying drawings.

DETAILED DESCRIPTION OF THE INVENTION

The present invention will be described herein in the context of exemplary methods and apparatus for more optimally placing an ESD structure in a wire-bonded IC. It is to be understood, however, that the techniques of the present invention are not limited to the methods and apparatus shown and described herein. Rather, the invention is more generally applicable to techniques for automatically laying out power pads in an IC having one or more power rings, pad pins, core pins and ESD structures. While specific steps may be described herein for implementing automated ESD placement and automated routing methodologies in accordance with embodiments of the invention, it is to be appreciated that these steps are merely illustrative, and that various other steps for performing similar functions are contemplated, as will become apparent to those skilled in the art.

Figure 1A:
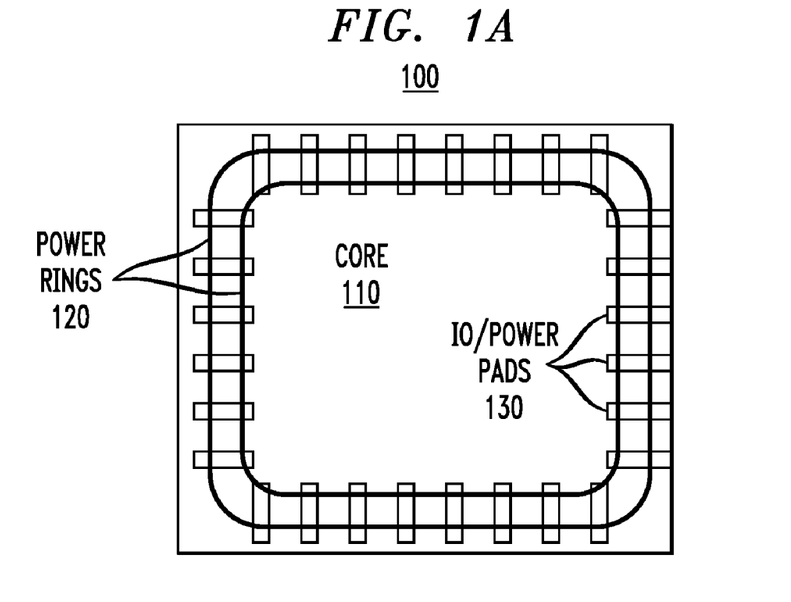
FIG. 1A is a diagram showing an exemplary power pad layout for a wire-bonded chip.

FIG. 1A is a diagram showing an exemplary power pad layout for a wire-bonded chip 100. The required power and ground pads for the proper functioning of the chip 100 are supplied by external voltage sources, which are omitted from the diagram for purposes of simplicity. On-chip power rings 120 preferably run around a periphery of the chip 100 to deliver power to one or more functional circuits which are typically located in a core 110 of the chip, although they may also be located on the periphery. A plurality of power pad structures 130 are also preferably located around a periphery of the chip 100. The power pads 130 connect the external voltage sources to the on-chip power rings 120 via pad pins and/or to the functional circuits within the core 110 of the chip via core pins.

Figure 1B:
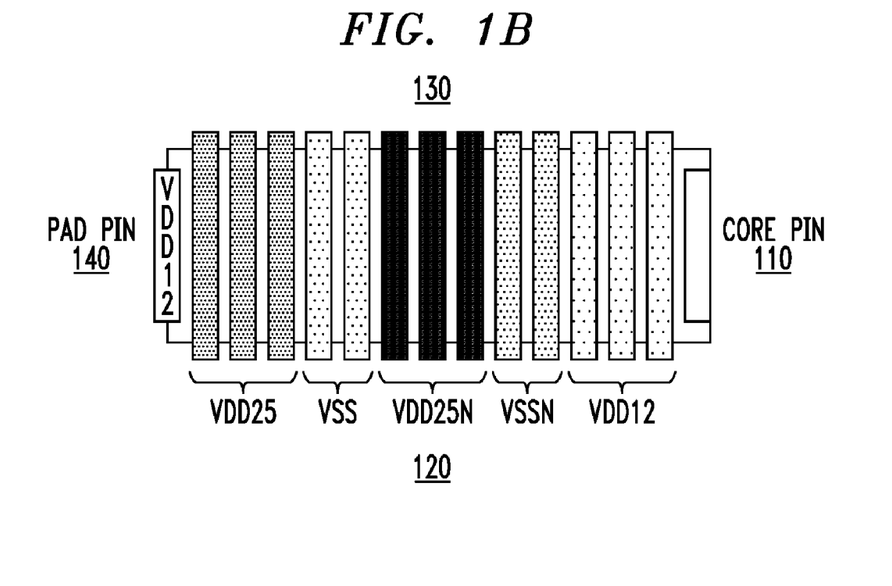
FIG. 1B is a diagram showing an enlarged view of one of the power pad structures in the exemplary power pad layout of FIG. 1A.

FIG. 1B is a diagram depicting an enlarged view of one of the power pads 130 in the exemplary pad layout shown in FIG. 1A. As apparent from the figure, the power rings 120 may comprise a plurality of bus connections, with one or more subsets of bus connections being coupled to different corresponding external voltage sources (e.g., VDD25, VSS, VDD25N, VSSN, VDD12). The power pad 130 preferably serves as an interface between the power rings 120, a corresponding pad pin 140 and core pin 110 in the chip.

Since power pads, as well as IO signal pads, serve as interface points between the external world and vulnerable on-chip circuitry, such power pads and IO signal pads typically employ ESD structures. These ESD structures protect the on-chip circuitry from potentially damaging external voltage surges attributable to an ESD event. Because of the excessive amount of current that an ESD structure must typically handle during the ESD event, placement of the ESD structure in the IC is critical for improving reliability and performance of the IC. The ESD structure should be placed on the frame prior to power pad routing. Placement of the ESD structure should be done in a such a manner that shortest paths are used to establish connections between the power rings while routing. Additionally, the placement of the ESD structure should strive to minimize resistive paths for the surge currents, thereby reducing voltage drops in the IC, often referred to as IR drops, and thus maintaining voltage at safer levels. This shortest path objective can be addressed by considering routing cost, whereas the objective of minimzing the resisitance of surge current paths can be addressed by considering the overlap area between power and ground connections of the ESD structure and the respective power rings.

The term "cost" as used herein may be defined as the Manhattan distance from all entry points in a current tile to all exit points in a previous tile, where a tile may be considered as a rectangular shape in the IC. This includes bending cost in the same metal layer, or alternative conductive layer, as well as in different metal layers, and level shifting between different metal layers utilizing, for example, conductive vias. Bending cost refers to the cost for a path having a bend in the same metal layer (e.g., a corner routing) or to another metal layer (e.g., using one or more vias). With the inclusion of bending costs, optimal routing paths can be obtained.

Figure 2:
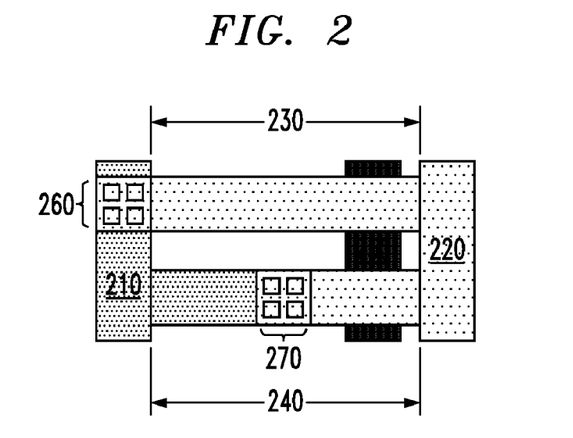
FIG. 2 is a diagram illustrating the concept of bending cost, in accordance with an aspect of the invention.

FIG. 2 is an exemplary layout illustrating bending costs. On FIG. 2, 210 and 220 represent tiles in different metal layers and 250 represents a blocking area in the same layer as tile 210. Paths 230 and 240 both connect tiles 210 and 220 and each has a via (260 and 270, respectively) between the two layers in which tiles 210 and 220 are located. Without considering bending costs, paths 230 and 240 would have substantially similar costs. However, bending in path 240 (e.g. between the layers in which tiles 210 and 220 are located) makes path 230 preferable.

Figure 3:
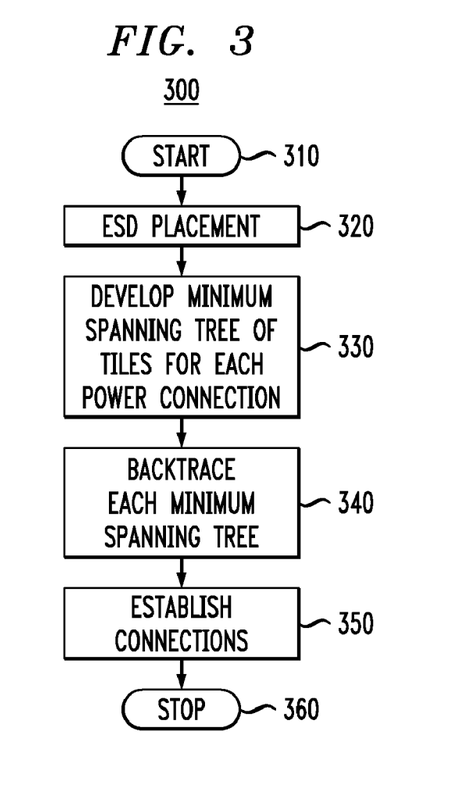
FIG. 3 is a simplified flow diagram showing an exemplary method for designing a power pad layout using inventive techniques.

FIG. 3 is a simplified flow diagram showing an exemplary method 300 for more optimally placing an ESD structure and routing/establishing power pad connections in an IC, in accordance with an embodiment of the invention. Method 300 begins in step 310, wherein certain initialization functions or alternative start-up procedures may be performed. In step 320, the method is operative to place one or more ESD structures (e.g., voltage or current clamp) within corresponding power pads in order to protect the core circuitry in the IC from receiving damaging voltage and/or current surges which may occur, for example, during an ESD event. Various methodologies may be employed for optimally placing the one or more ESD structures within the corresponding power pads, in accordance with embodiments of the invention.

After placement of the ESD structure, routing connections between a pad pin, a core pin, the ESD structure and power rings corresponding to a given power pad are preferably established. A corner-stitching data structure, a grid-less approach in which a routing region is partitioned into various bus type tiles and space tiles, is preferably employed to perform such routing of connections, although other routing methodologies may be similarly employed. In order to establish connections between two tiles of the same power ring, shortest paths between these tiles are computed using, for example, a minimum spanning tree technique. All possible paths are explored using this approach and some of these paths may be eliminated in a back-tracing process, described in further detail herein below.

In step 330, a minimum spanning tree of tiles is generated for each power connection in the power pad. In a traditional minimum spanning tree, which is node-based, the distance between two nodes is always a unique number. If the nodes are considered as tiles, as in the present methodology, then the distance between two tiles will depend on the points considered in both the source tile (ps) and the destination tile (pd). Moreover, it is important to consider the existence of multiple (ps, pd) pairs having minimum distance between them. This minimum spanning tree preferably determines not only the ordering of tiles having minimal cost but also entry and exit points for each connection between tiles and, furthermore, accounts for the possibility of multiple connections between two tiles with substantially identical cost. However, this tree may also include unnecessary tiles, which may include, for example, tiles associated with a different connection, analog signals, pass through signals, bond pads, probing pads or other areas through which routing is prohibited according to the design rules, which may be referred to herein as "no fly" areas.

In order to eliminate certain routing paths, methodology 300, in step 340, preferably performs a back-tracing process. The back-tracing process ensures that only paths required for a given power connection are included in the final routed paths list. Step 350 is a step in which connections are established as a function of, for example, current handling requirements and/or DRC rules corresponding to the IC fabrication process being utilized.

Connections may be established with either a single metal layer or multiple metal layers. If more current handling capability is required, as in the case of primary connections (e.g., connections to pad metal), one or more parallel paths are routed. In the case of secondary connections (e.g., connections between other power rings which do not connect to the pad pin), only one path with minimum metal width is routed. For more robust connections, extra metal may be required to be routed other than the paths obtained after back-tracing. If the number of vias from one metal layer to another metal layer is not sufficient for the particular current handling requirements of a given connection, more vias and/or larger vias are provided to meet the demand. Method 300 ends at step 360.

Figure 4:
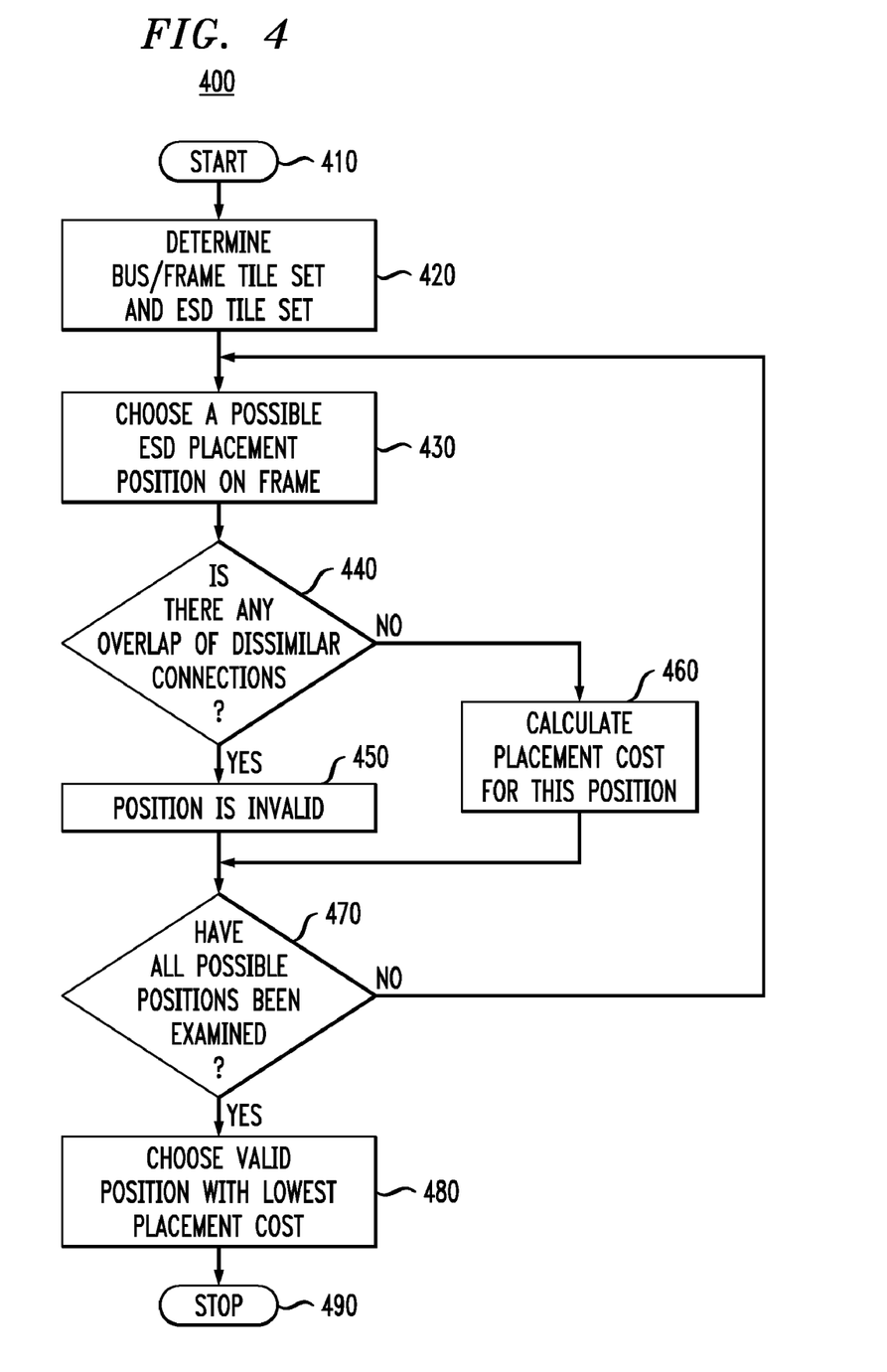
FIG. 4 is a simplified flow diagram showing an exemplary method for determining optimal ESD placement using inventive techniques.

FIG. 4 is a flow diagram showing an exemplary method 400 for determining an optimal ESD placement, in accordance with one aspect of the invention. This method may be utilized, for example, in step 320 of ESD structure place and route method 300 depicted in FIG. 3. Frame and global bussing information are essential inputs to the power pad generation process. Frame information provides layout boundaries whereas global bussing information establishes the number of power rings and their respective distribution across metal layers in the IC. Connections between pad pin and the corresponding bus may be established through the metallization of computed paths to be routed. The location and size of the pad pin will depend on the bus structure, which is governed, at least in part, by the functionality and application of the IC.

ESD structure power and ground connections to the respective power rings are important for efficient protection of the IC. The ESD structure is preferably placed such that it either dissipates excessive power or handles excessive currents typically characteristic of an ESD event. Optimal placement for the ESD structure is, thus, preferably determined by calculating resistance, whereas optimal routing may be determined based, for example, on a modified minimum spanning tree methodology. Depending on the power pad type, routing should be performed between pad pin and the respective power and/or ground metal bussing of the power rings. This connection may be defined as a primary connection and the remaining connections can be defined as secondary connections. For example, with reference again to FIG. 1B, the connection between a pad pin 140 for a given voltage supply (e.g., VDD12) and the respective power rings 120 (e.g., VDD12) corresponding to this voltage supply may be defined as a primary connection. Connections among the power rings may be defined as secondary connections (e.g., connections among all VDD25N rings).

Method 400 begins in step 410, wherein certain initialization functions or alternative start-up procedures may be performed. The method continues at step 420, wherein a procedure is performed for partitioning the power pad into sets of tiles. A first set of tiles preferably represents buses and/or frames and is based on the global bussing; the second set of tiles, namely, an ESD structure tile set, is based on data concerning the ESD structure to be placed on the frame.

In step 430, one of the possible ESD placement positions on the frame is chosen. Ultimately, this process may iterate through all possible placements of the ESD structure on the frame in order to determine which position is more favorable. In step 440, the process checks to see whether or not there are any overlap areas of dissimilar connections between the bus and/or frame tiles and the ESD structure tiles in this placement. For example, connecting a power bus (e.g., VDD) with a ground bus (e.g., VSS) in the ESD structure would result in a short-circuit in the IC, thereby causing the IC to malfunction. If such an overlap area of dissimilar connections exists, this placement is noted as being an invalid position in step 450 and is not considered further.

Assuming there are no such overlap areas of dissimilar connections, the placement cost for this position is calculated in step 460. This placement cost may be calculated as a weighted sum of the power routing cost and ground routing cost (where the routing cost represents the Manhattan distance between a power ring connection and an ESD structure connection, as previously stated; minimizing these distances will minimize the distance traveled by the current) less the weighted overlap area of similar connections (e.g. VDD33 frame and/or bus with VDD33 ESD structure connection), which will minimize resistivity. In other words, ESD structure placement cost, PCFN, may be defined according to the following expression:

$$PCFN = k_1 \cdot PwrRC + k_2 \cdot GndRC - k_3 \cdot OA,$$

where $k_1$, $k_2$ and $k_3$ are weight factors, PwrRC represents ESE) structure power routing cost, GndRC represents ground routing cost, and OA represents overlap area between ESD structure power and/or ground and the power rings (e.g., overlap area of similar connections).

In step 470, if there are possible ESD structure placements which have not been analyzed, the process will return to step 430 and this analysis will be repeated for another possible placement. This continues until all possible ESD structure placements have been analyzed, in which case the method proceeds to step 480. In step 480, a valid ESD structure position (e.g., one without an overlap of dissimilar connections) having the lowest placement cost (e.g., as calculated in step 460) is selected, and the process then ends in step 490.

After ESD structure placement on the frame has been determined, connection routing between pad pin, core pin, ESD clamp and power rings is preferably established, as previously explained. To accomplish this, a corner-stitching data structure may be employed. When one type of power ring connection is considered, other types of power rings are treated as blocking regions for that routing. Corner-stitching is a known routing approach that is described, for example, in the article J. K. Ousterhout, "Corner Stitching: A Data-Structuring Technique for VLSI Layout Tools," *IEEE Trans. Computer-Aided Design*, Vol. CAD-3, January 1984, pp. 87-100, which is incorporated by reference herein, although the invention contemplates alternative routing methodologies. In order to establish connections between two tiles of the same power ring, the shortest path between these tiles is preferably determined, such as by using a modified minimum spanning tree technique to explore all possible paths.

Figure 5:
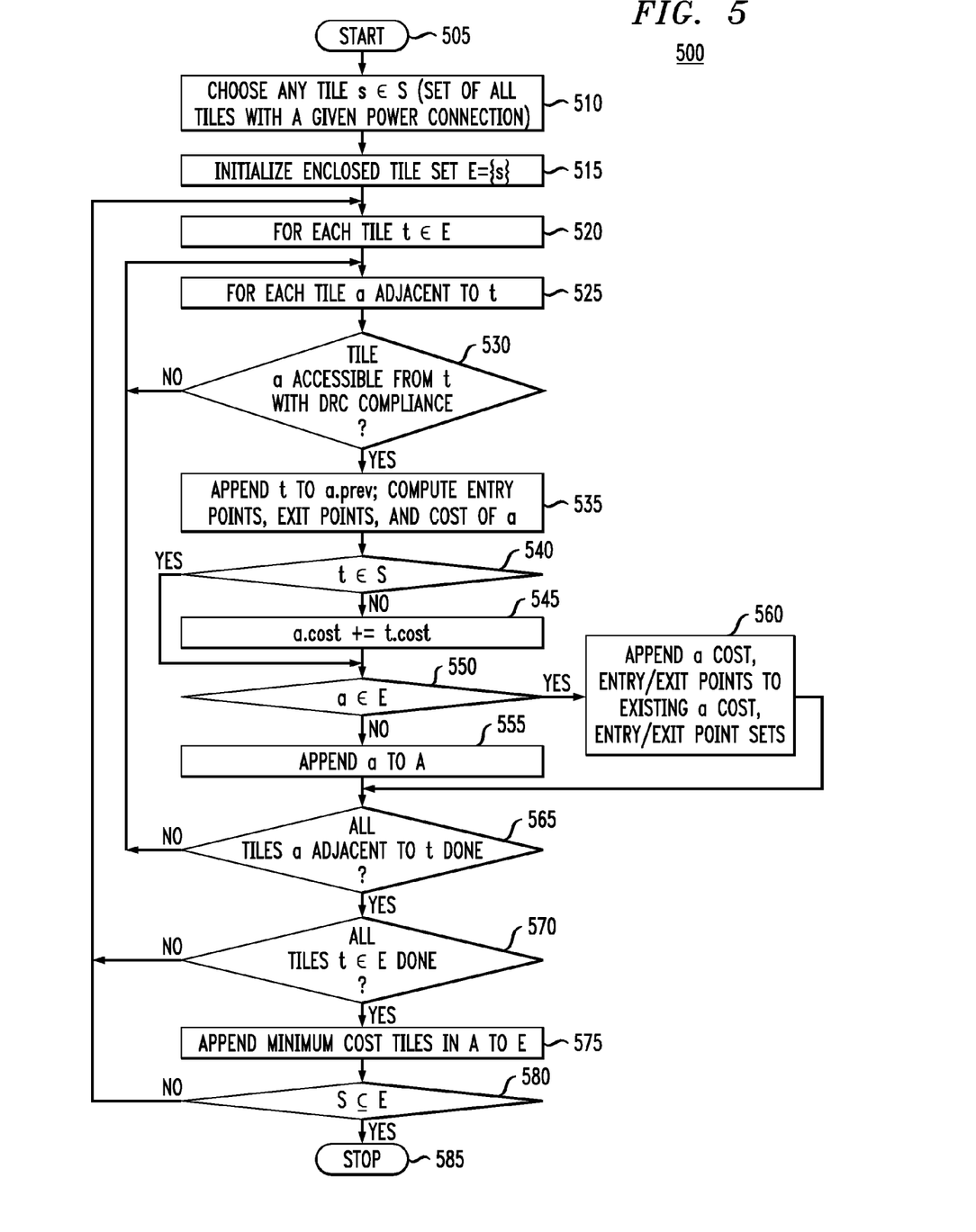
FIG. 5 is a simplified flow diagram showing an exemplary method for determining a minimum spanning tree using inventive techniques.

FIG. 5 is a simplified flow diagram showing an exemplary method 500 for determining an optimal power pad layout, in accordance with another aspect of the invention. This method may be utilized, for example, in step 330 of ESD structure place and route method 300 depicted in FIG. 3. Method 500 begins in step 505, wherein certain initialization functions or alternative start-up procedures may be performed. In step 510, any tile, henceforth represented as s, within a set, henceforth represented as S, of all tiles with a given power connection (e.g., all tiles connected to VDD33) is selected. In this illustrative embodiment, a tile is implemented as a data structure capable of storing pointers to other tiles. The data structure is further capable of storing, for each tile, coordinates of a point within each tile from which a connection may be made in compliance with DRC requirements and the cost of that connection, which may be referred to herein as tile.prev, tile.entry, tile.exit, and tile.cost, respectively, where "tile" represents the name of a given one of these tile data structures.

For example, a.prev preferably represents a set of previous tiles which are adjacent to tile a and can access tile a with DRC compliance; a.entry is a set of points at the edge of the corresponding tile entry in a.prev from which a minimum cost path can be drawn to tile a; a.exit represents a set of the points at the edge of tile a to which a minimum cost path can be drawn to the corresponding tile entry in a.prev; a.cost is a set of integers representing the sum of Manhattan distances between the corresponding entries in a.exit and a.entry and the corresponding cost of a.entry in a.prev tile, or the Manhattan distance of the minimum cost path between tile a and the corresponding entry in a.prev. Cost, in this case, includes bending cost in the same metal layer as well as in two different metal layers using vias.

Step 515 involves the inialization of an enclosed tile set, E, to contain only s, as well as initialization of various parameters of s itself. In an illustrative embodiment, s.prev, s.exit, and s.cost may be all assigned null values, and s.entry may be set equal to the coordinates of s itself. Method 500 advances to step 520 and begins iterating through each tile, t, contained within set E. In step 525, the method begins interating through each tile, a, adjacent to tile t. In step 530, the method checks to ensure that adjacent tile a can be accessed from tile t in compliance with DRC. If not, the method stops processing that tile and instead goes back to step 525 to choose a different tile. Otherwise, in step 535, the method appends tile t to a.prev. Step 535 also preferably sets a.exit to be the point in tile t from which tile a is accessed and a.entry to be the point in tile a from which tile t is accessed. Finally, in step 535, a.cost is set to be the Manhattan distance between a.entry and a.exit.

In step 540, method 500 checks to see whether tile t is within set S (the set of all tiles with a given power connection). If tile t is an element of set S, the method proceeds directly to step 550; otherwise, a.cost is incremented by t.cost in step 545 before proceeding to step 550, wherein the method checks to see whether tile a is in set E, the enclosed tile set. If tile a is not an element of set ES the method proceeds to step 555, where tile a is appended to set A, a set of minimum cost tiles. If tile a is an element of set E, the method proceeds to step 560, where a.cost is appended to the existing cost set of tile a, as are the entry point set and exit point set. In either case, the method proceeds to step 565, where it checks to see if all tiles a adjacent to tile t have been processed. If all tiles a adjacent to tile t have not been processed, the method returns to step 525 and processes the next adjacent tile; otherwise, the method proceeds to step 570 wherein it checks to see if all tiles t in set E have been processed. If all tiles t in set E have not been processed, the method returns to step 520 to process the next tile; otherwise, the method proceeds to step 575.

In step 575, the method appends the minimum cost tile set in set A to set E, the enclosed tile set. In step 580, the method then checks to see if S, the set of all tiles, is a subset of E, or in other words, whether the enclosed tile set includes all of the tiles of that power connection. If all tiles of the power connection are not included in the enclosed tile set, the method returns to step 520 to continue processing. Otherwise, the minimum spanning tree generation is complete in step 585.

Figure 6:
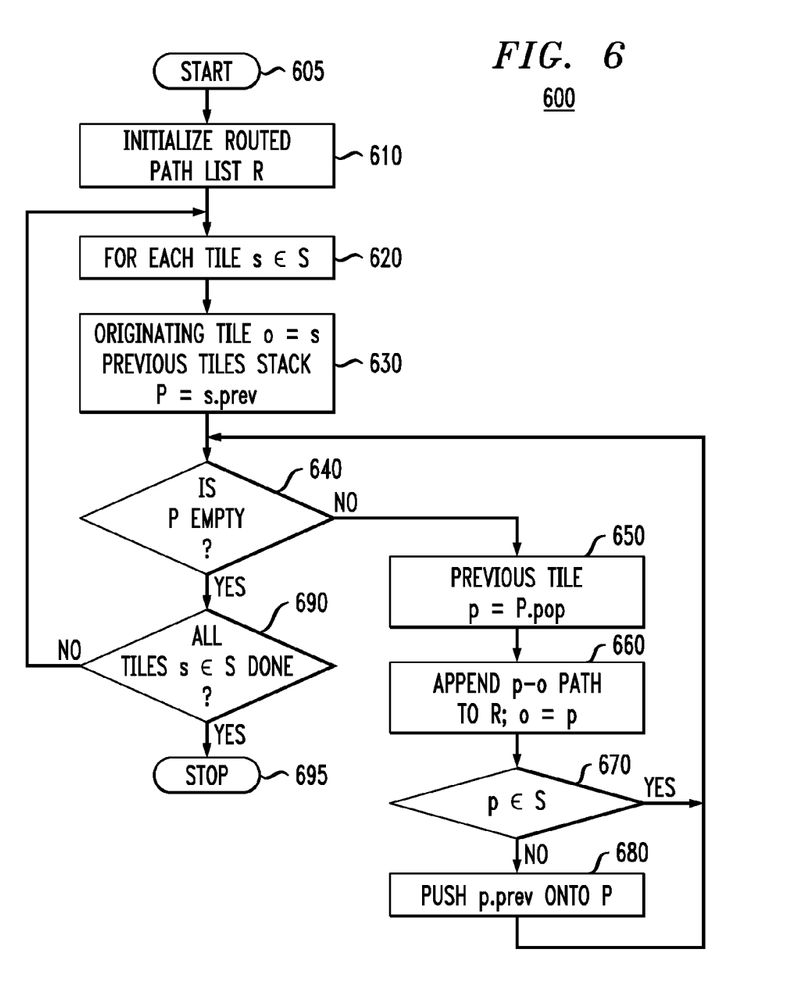
FIG. 6 is a simplified flow diagram showing an exemplary method for back-tracing a minimum spanning tree using inventive techniques.

FIG. 6 is a flow diagram showing an exemplary method 600 for back-tracing a minimum spanning tree, in accordance with an aspect of the invention. This method may be utilized, for example, in step 340 of ESD structure place and route method 300 depicted in FIG. 3. As stated above, back-tracing is preferably employed in order to eliminate paths which are not involved in paths between at least two tiles of a given power connection, and thereby ensures that only paths actually used in the given power connection are included in the final routed paths list. It is to be understood that the invention is not limited to the particular back-tracing methodology shown.

The illustrative method 600 begins in step 605, wherein certain initialization functions or alternative start-up procedures may be performed. The method proceeds to step 610, wherein a routed path list, R, is initialized. Each routed path R preferably represents a connection between two tiles. In step 620, the method begins to iterate through each tile, s, in the set of all tiles, S, having a given power connection (e.g., all VDD tiles). Next, in step 630, an originating tile, o, is preferably set equal to tile s and a previous tiles stack, P, is set equal to the previous tiles set of s, namely, s.prev. The method then proceeds to step 640, where it checks to see whether P, the previous tiles stack, is empty.

If previous tile stack P is not empty in step 640, previous tile p is popped from previous tile stack P (e.g., the top tile is removed from the stack and assigned to p) in step 650. The method then proceeds to step 660, wherein the path from previous tile p to the originating tile o is added to the routed path list R, and then tile o is set equal to tile p. Next, in step 670, the method checks to see whether p is within S, the set of all tiles having a given power connection. If p is not within S, the method proceeds to step 680 and pushes p.prev onto previous tiles stack P before returning to step 640; if tile p is within S, the method returns to step 640.

If previous tile stack P is empty in step 640, the method proceeds to step 690 which checks whether all tiles s within S, the set of all tiles of that power connection, have been processed. If not, the method returns to step 620 to process the next tile s. If all tiles s in set S have been processed, the method terminates in step 695, generating R, the minimal set of routed paths.

The specific steps described for implementing automated ESD placement and automated routing methodologies in accordance with embodiments of the invention are merely illustrative, and that various other steps for performing similar functions are contemplated, as will become apparent to those skilled in the art.

Figure 7:
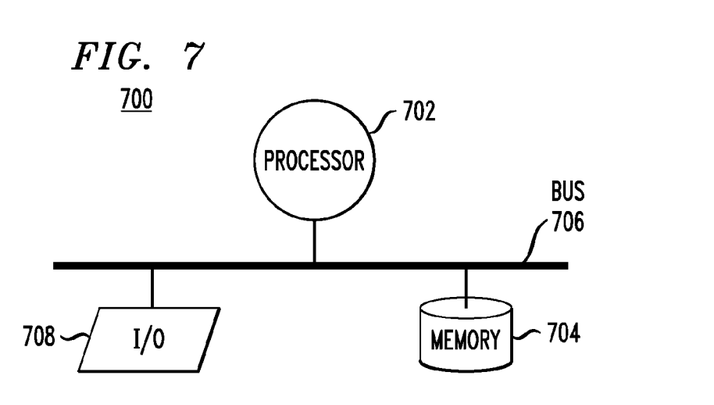
FIG. 7 is a block diagram depicting an exemplary processing system in which techniques of the present invention may be implemented, in accordance with an embodiment of the invention.

The methodologies of embodiments of the invention may be particularly well-suited for use in an electronic device or alternative system. For example, FIG. 7 is a block diagram depicting an exemplary processing system 700 formed in accordance with an aspect of the invention. System 700 may include a processor 702, memory 704 coupled to the processor (e.g., via a bus 706 or alternative connection means), as well as input/output (I/O) circuitry 708 operative to interface with the processor. The processor 702 may be configured to perform at least a portion of the methodologies of the present invention, illustrative embodiments of which are shown in the previous figures and described herein above.

It is to be appreciated that the term "processor" as used herein is intended to include any processing device, such as, for example, one that includes a central processing unit (CPU) and/or other processing circuitry (e.g., network processor, digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor. In any case, it is to be appreciated that at least a portion of the components shown in the previous figures may be implemented in various forms of hardware, software, or combinations thereof (e.g., one or more DSPs with associated memory, application-specific integrated circuit(s), functional circuitry, one or more operatively programmed general purpose digital computers with associated memory, etc). Given the teachings of the invention provided herein, one of ordinary skill in the art will be able to contemplate other implementations of the components of the invention.

At least a portion of the illustrative techniques of the present invention may be implemented in an integrated circuit. In forming integrated circuits, die are typically fabricated in a repeated pattern on a surface of a semiconductor wafer. Each of the die includes a device described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of designing a power pad layout in an integrated circuit, the method comprising the steps of:
   determining a location of at least one electrostatic discharge (ESD) structure in the integrated circuit so as to minimize a placement cost; and
   determining a location of at least one connection between the at least one ESD structure and at least one power ring in the integrated circuit;
   wherein the steps are performed at least in part by a processor;
   wherein the step of determining a location of at least one connection comprises:
   representing a power pad layout as a set of corner-stitched tiles comprising at least one corner-stitched tile representing each of a plurality of elements to be connected to a given power ring; and
   determining a minimum spanning tree of the corner-stitched tiles representing elements to be connected to a given power ring; and
   wherein the step of determining a minimum spanning tree of corner-stitched tiles representing elements to be connected to a given power ring comprises the steps of:
   (1) adding a tile from a set of all tiles representing the elements to be connected to a given power ring to an enclosed tile set;
   (2) selecting a member of the enclosed tile set;
   (3) selecting a tile adjacent to the selected member of the enclosed tile set such that the selected adjacent tile can be reached from the selected member tile in compliance with one or more design rule checks;
   (4) if the selected adjacent tile is not within the enclosed tile set, adding the selected adjacent tile to a set of minimum cost tiles;
   (5) repeating steps (3) and (4) for each tile adjacent to the selected member of the enclosed tile set;
   (6) repeating steps (2) through (4) for each member of the enclosed tile set;
   (7) appending the set of minimum cost tiles to the enclosed tile set; and
   (8) repeating steps (2) through (7) until the enclosed tile set includes all tiles representing elements to be connected to the given power ring.

2. The method of claim 1, wherein the ESD structure comprises at least one of a voltage clamp and a current clamp.

3. The method of claim 1, wherein the placement cost comprises an ESD structure power routing cost, an ESD structure ground routing cost, and a cost related to an overlap area between an ESD structure power circuit, an ESD structure ground circuit, and the at least one power ring.

4. The method of claim 1, wherein the step of determining a location of at least one ESD structure comprises the steps of:
   examining possible ESD placements to determine whether there is any overlap of dissimilar connections;
   computing the placement cost for each possible ESD placement with no overlap of dissimilar connections; and
   selecting the ESD placement with no overlap of dissimilar connections that has a minimal placement cost.

5. The method of claim 1, wherein a tile comprises at least one of: a set of previous tiles, comprising tiles which are adjacent tiles of the tile and can access the tile; a set of entry points, which are points at an edge of a corresponding tile entry in the set of previous tiles from which a minimum cost path can be drawn to the tile; a set of exit points, which are points at an edge of the tile to which a minimum cost path can be drawn to the corresponding tile entry in the set of previous tiles; and a set of costs, representing cumulative Manhattan distances between corresponding entries in the set of entry points and the set of exit points, or the cumulative Manhattan distance of the minimum cost path between the tile and the corresponding entry in the set of previous tiles.

6. The method of claim 5, further comprising the steps of:
   (a) computing the entry points, the exit points, and the cost of a path from the selected member of the enclosed tile set to the selected adjacent tile;
   (b) if the selected member of the enclosed tile set is not a member of the set of tiles representing elements to be connected to a given power ring, incrementing the cost of the selected adjacent tile by the cost of the selected member tile; and (c) if the selected adjacent tile is within the enclosed tile set, appending the cost, entry points, and exit points of the selected adjacent tile to include information relating to at least one path to the selected member tile;

wherein steps (5), (6) and (8) further comprise repeating the above steps (a) through (c).

7. The method of claim 1, wherein the step of determining a location of at least one connection further comprises back-tracing through the minimum spanning tree of elements to be connected to a given power ring.

8. The method of claim 7, wherein the step of back-tracing generates a minimal list of routed paths among the elements to be connected to a given power ring.

9. The method of claim 1, further comprising the step of determining at least one additional characteristic of the at least one connection.

10. The method of claim 9, wherein the at least one additional characteristic comprises a number of vias necessary to satisfy current demands.

11. Apparatus for designing a power pad layout, the apparatus comprising:

memory; and at least one processor coupled to the memory, the processor being operative to:

determine a location of at least one electrostatic discharge protective device (ESD) so as to minimize a placement cost; and determine a location of at least one connection between the at least one ESD and at least one power ring.

wherein in determining a location of at least one connection, the processor is further operative to:

represent a power pad layout as a set of corner-stitched tiles comprising at least one corner-stitched tile representing each of a plurality of elements to be connected to a given power ring; and determine a minimum spanning tree of the corner-stitched tiles representing elements to be connected to a given power ring;

wherein in determining a minimum spanning tree of elements associated with a given power ring, the processor is operative to:

(1) add a tile from a set of all tiles representing the elements to be connected to a given power ring to an enclosed tile set;

(2) select a member of the enclosed tile set;

(3) select a tile adjacent to the selected member of the enclosed tile set such that the selected adjacent tile can be reached from the selected member tile in compliance with one or more design rule checks;

(4) if the selected adjacent tile is not within the enclosed tile set, add the selected adjacent tile to a set of minimum cost tiles;

(5) repeat steps (3) and (4) for each tile adjacent to the selected member of the enclosed tile set;

(6) repeat steps (2) through (4) for each member of the enclosed tile set;

(7) append the set of minimum cost tiles to the enclosed tile set; and (8) repeat steps (2) through (7) until the enclosed tile set includes all tiles representing elements to be connected to the given power ring.

12. The apparatus of claim 11, wherein the processor is further operative to:

back-trace through a minimum spanning tree in order to determining a minimal list of routed paths amon the elements.

13. An article of manufacture comprising a machine-readable storage medium containing one or more software programs that, when executed, perform the steps of:

determining a location of at least one electrostatic discharge protective device (ESD) so as to minimize a placement cost;

determining a location of at least one connection between the at least one ESD and at least one power ring.

wherein the step of determining a location of at least one connection comprises:

representing a power pad layout as a set of corner-stitched tiles comprising at least one corner-stitched tile representing each of a plurality of elements to be connected to a given power ring; and determining a minimum spanning tree of the corner-stitched tiles representing elements to be connected to a given power ring; and wherein the step of determining a minimum spanning tree of corner-stitched tiles representing elements to be connected to a given power ring comprises the steps of:

(1) adding a tile from a set of all tiles representing the elements to be connected to a given power ring to an enclosed tile set;

(2) selecting a member of the enclosed tile set;

(3) selecting a tile adjacent to the selected member of the enclosed tile set such that the selected adjacent tile can be reached from the selected member tile in compliance with one or more design rule checks;

(4) if the selected adjacent tile is not within the enclosed tile set, adding the selected adjacent tile to a set of minimum cost tiles;

(5) repeating steps (3) and (4) for each tile adjacent to the selected member of the enclosed tile set;

(6) repeating steps (2) through (4) for each member of the enclosed tile set;

(7) appending the set of minimum cost tiles to the enclosed tile set; and (8) repeating steps (2) through (7) until the enclosed tile set includes all tiles representing elements to be connected to the given power ring.

14. The article of claim 13, wherein the step of determining a location of at least one connection further comprises the step of:

back-tracing through the minimum spanning tree to determine a minimal list of routed paths among the elements.

15. The apparatus of claim 11, wherein in determining a location of at least one ESD, the processor is operative to:

examine possible ESD placements to determine whether there is any overlap of dissimilar connections;

compute the placement cost for each possible ESD placement with no overlap of dissimilar connections; and select the ESD placement with no overlap of dissimilar connections that has a minimal placement cost.

16. The apparatus of claim 11, wherein a tile comprises at least one of: a set of previous tiles, comprising tiles which are adjacent tiles of the tile and can access the tile; a set of entry points, which are points at an edge of a corresponding tile entry in the set of previous tiles from which a minimum cost path can be drawn to the tile; a set of exit points, which are points at an edge of the tile to which a minimum cost path can be drawn to the corresponding tile entry in the set of previous tiles; and a set of costs, representing cumulative Manhattan distances between corresponding entries in the set of entry points and the set of exit points, or the cumulative Manhattan distance of the minimum cost path between the tile and the corresponding entry in the set of previous tiles.

17. The apparatus of claim 16, wherein in determining a minimum spanning tree of elements associated with a given power ring, the processor is further operative to:
(a) compute the entry points, the exit points, and the cost of a path from the selected member of the enclosed tile set to the selected adjacent tile;
(b) if the selected member of the enclosed tile set is not a member of the set of tiles representing elements to be connected to a given power ring, increment the cost of the selected adjacent tile by the cost of the selected member tile; and
(c) if the selected adjacent tile is within the enclosed tile set, append the cost, entry points, and exit points of the adjacent tile to include information relating to at least one path to the selected member tile;
wherein operations (5), (6) and (8) further comprise repeating the above operations (a) through (c).

18. The article of claim 13, wherein the step of determining a location of at least one ESD comprises the steps of:
examining possible ESD placements to determine whether there is any overlap of dissimilar connections;
computing the placement cost for each possible ESD placement with no overlap of dissimilar connections; and
selecting the ESD placement with no overlap of dissimilar connections that has a minimal placement cost.

19. The article of claim 13, wherein a tile comprises at least one of: a set of previous tiles, comprising tiles which are adjacent tiles of the tile and can access the tile; a set of entry points, which are points at an edge of a corresponding tile entry in the set of previous tiles from which a minimum cost path can be drawn to the tile; a set of exit points, which are points at an edge of the tile to which a minimum cost path can be drawn to the corresponding tile entry in the set of previous tiles; and a set of costs, representing cumulative Manhattan distances between corresponding entries in the set of entry points and the set of exit points, or the cumulative Manhattan distance of the minimum cost path between the tile and the corresponding entry in the set of previous tiles.

20. The article of claim 19, wherein the step of determining a minimum spanning tree of corner-stitched tiles representing elements to be connected to a given power ring further comprises:
(a) computing the entry points, the exit points, and the cost of a path from the selected member of the enclosed tile set to the selected adjacent tile;
(b) if the selected member of the enclosed tile set is not a member of the set of tiles representing elements to be connected to a given power ring, incrementing the cost of the selected adjacent tile by the cost of the selected member tile; and
(c) if the selected adjacent tile is within the enclosed tile set, appending the cost, entry points, and exit points of the selected adjacent tile to include information relating to at least one path to the selected member tile;
wherein steps (5), (6) and (8) further comprise repeating the above steps (a) through (c).

* * * * *